United States Patent
Aoki et al.

(10) Patent No.: US 10,875,973 B2
(45) Date of Patent: Dec. 29, 2020

(54) IONIC LIQUID AND METHOD FOR DISSOLVING CELLULOSE USING THE SAME

(71) Applicant: Panasonic Intellectual Property Management Co., Ltd., Osaka (JP)

(72) Inventors: Takahiro Aoki, Osaka (JP); Tomoko Kawashima, Osaka (JP); Haruka Kusukame, Kyoto (JP); Yuko Taniike, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/796,170

(22) Filed: Feb. 20, 2020

(65) Prior Publication Data
US 2020/0239647 A1 Jul. 30, 2020

Related U.S. Application Data

(63) Continuation of application No. 15/912,576, filed on Mar. 6, 2018, now abandoned.

(30) Foreign Application Priority Data

Mar. 27, 2017 (JP) .................. 2017-061043

(51) Int. Cl.
C08J 3/00 (2006.01)
C08J 3/09 (2006.01)
C08B 1/00 (2006.01)

(52) U.S. Cl.
CPC .............. *C08J 3/096* (2013.01); *C08B 1/003* (2013.01); *C08J 2301/02* (2013.01)

(58) Field of Classification Search
None
See application file for complete search history.

(56) References Cited

U.S. PATENT DOCUMENTS 7,828,936 B2 * 11/2010 Luo .................. D01F 2/02
                                              162/157.6
2014/0048223 A1 * 2/2014 Li .................. D21C 3/003
                                              162/60

(Continued)

FOREIGN PATENT DOCUMENTS

JP   2010214324 A * 9/2010 ........... B01D 53/228
JP   2010214324 A    9/2010

(Continued)

OTHER PUBLICATIONS

JP-2010214324-A—english translation (Year: 2010).*

(Continued)

*Primary Examiner* — Stefanie J Cohen
(74) *Attorney, Agent, or Firm* — McDermott Will & Emery LLP

(57) ABSTRACT

The present invention provides an ionic liquid represented by the following chemical formula (I):

$$[(CH_3)_3N(CH_2)_2OH]^+[NH_2\text{-}L\text{-}COO]^- \quad (I)$$

where L is $-(CH_2)_2-$ or $-(CH_2)_3-$.

The present invention also provides an ionic liquid composition containing an ionic liquid; and water. The ionic liquid is represented by the above chemical formula (I). A molar ratio of $[(CH_3)_3N(CH_2)_2OH]^+$ to $[NH_2\text{-}L\text{-}COO]^-$ is not less than 0.86 and not more than 1.12. A weight ratio of the water to the ionic liquid composition is not more than 4.7%. The present invention provides an ionic liquid capable of dissolving cellulose without an cellulose-degrading enzyme (namely, an enzyme capable of hydrolyzing cellulose).

24 Claims, 10 Drawing Sheets

(56) References Cited

U.S. PATENT DOCUMENTS

2015/0368371 A1* 12/2015 Rogers ............... C08B 37/0003
 524/13
2017/0029801 A1 2/2017 Kaneko et al.

FOREIGN PATENT DOCUMENTS

| JP | 2012-144441 A | 8/2012 |
|----|---------------|--------|
| JP | 2015-096255 A | 5/2015 |
| JP | 2016-145272 A | 8/2016 |
| WO | 2015156398 A1 | 10/2015 |

OTHER PUBLICATIONS

Tao et al, Synthesis and Thermophysical Properties of Biocompatible Cholinium-Based Amino Acid Ionic Liquids, j, chem. eng. data, 58, 1542-1548 (Year: 2013).*

Final Office Action issued in U.S. Appl. No. 15/912,576 dated Nov. 26, 2019.

Non-Final Office Action issued in U.S. Appl. No. 15/912,576 dated Aug. 2, 2019.

Non-Final Office Action issued in U.S. Appl. No. 15/912,576 dated Feb. 25, 2019.

JP-2010214324-A English goole translation (Year: 2012).

JP-2010214324-A English JPO translation (Year: 2012).

Tao et al., Synthesis and Thermophysical Properties of Biocompatible Cholinium-Based Amino Acid Ionic Liquids, j. chem. eng. data, 58 pgs. 1542-1548 (Year: 2013).

Rub et al., low melting point mixtures in organic synthesis—an alternative to ionic liquids?, green chem, 14 pages 2969-2982 (Year: 2012).

English translation of WO2015156398 (Year: 2015).

Ning Sun et al., "Understanding pretreatment efficacy of four cholinium and imidazolium ionic liquids by chemistry and computation", Royal Society of Chemistry, Green Chemistry, 2014, 16, Jan. 30, 2014, pp. 2546-2557.

Qiu-Ping Liu et al., "Ionic liquids from renewable biomaterials: synthesis, characterization and application in the pretreatment of biomass", Green Chemistry, 2012, 14, Dec. 14, 2011, pp. 304-307, and Supplementary materials thereof.

Final Office Action issued in corresponding U.S. Appl. No. 15/912,576, dated Nov. 26, 2019.

Non-Final Office Action issued in corresponding U.S. Appl. No. 15/912,576, dated Aug. 2, 2019.

Non-Final Office Action issued in corresponding U.S. Appl. No. 15/912,576, dated Feb. 25, 2019.

* cited by examiner

IONIC LIQUID AND METHOD FOR DISSOLVING CELLULOSE USING THE SAME

CROSS-REFERENCE OF RELATED APPLICATIONS

This application is a Continuation of U.S. patent application Ser. No. 15/912,576, filed on Mar. 6, 2018, now abandoned, which in turn claims the benefit of Japanese Application No. 2017-061043, filed on Mar. 27, 2017, the entire disclosures of which Applications are incorporated by reference herein.

BACKGROUND

1. Technical Field

The present invention relates to an ionic liquid and a method for dissolving cellulose using the same.

2. Description of the Related Art

Patent Literature 1 discloses using an ionic liquid as an enzyme saccharification pretreatment agent of cellulosic biomass. Patent Literature 1 discloses choline acetate as an ionic liquid in the paragraph [0037] thereof. Furthermore, in the paragraph [0022] thereof, Patent Literature 1 discloses that an example of the anion of the ionic liquid is an amino acid anion such as glutaminic acid anion.

Patent Literature 2 discloses an ionic liquid, a purification method of the ionic liquid, and a treatment method of cellulose-based biomass. Patent Literature 2 discloses in the paragraphs [0024]-[0026] thereof that an example of the anion of the ionic liquid is an anion of an amino acid such as alanine, lysine, threonine, isoleucine, asparagine, valine, phenylalanine, tyrosine, methionine, leucine, or ornithine.

Non Patent Literature 1 and Non Patent Literature 2 disclose degradation of cellulose using a cellulose-degrading enzyme (namely, an enzyme capable of hydrolyzing cellulose) together with the degradation accelerator of an ionic liquid consisting of $[(CH_3)_3NCH_2CH_2OH]^+[NH_2(CH_2)_4CH(NH_2)COO]^-$ (hereinafter, referred to as "[Ch][Lys]").

CITATION LIST

Patent Literature 1
Japanese patent laid-open publication No. 2015-096255A
Patent Literature 2
Japanese patent laid-open publication No. 2012-144441A
Patent Literature 3
Japanese patent laid-open publication No. 2016-145272A
Non Patent Literature 1
Ning Sun et. al., "Understanding pretreatment efficacy of four cholinium and imidazolium ionic liquids by chemistry and computation", Royal Society of Chemistry, Green Chem., 2014, 16, 2546-2557
Non Patent Literature 2
Qiu-Ping Liu et. al., "Ionic liquids from renewable biomaterials: synthesis, characterization and application in the pretreatment of biomass", Green Chemistry, 2012, 14, 304-307

SUMMARY

The present invention provides an ionic liquid represented by the following chemical formula (I):

$$[(CH_3)_3N(CH_2)_2OH]^+[NH_2\text{-}L\text{-}COO]^- \quad (I)$$

where L is $-(CH_2)_2-$ or $-(CH_2)_3-$.

The present invention provides an ionic liquid capable of dissolving cellulose without an cellulose-degrading enzyme (namely, an enzyme capable of hydrolyzing cellulose).

DETAILED DESCRIPTION OF THE EMBODIMENT

Figure 1:
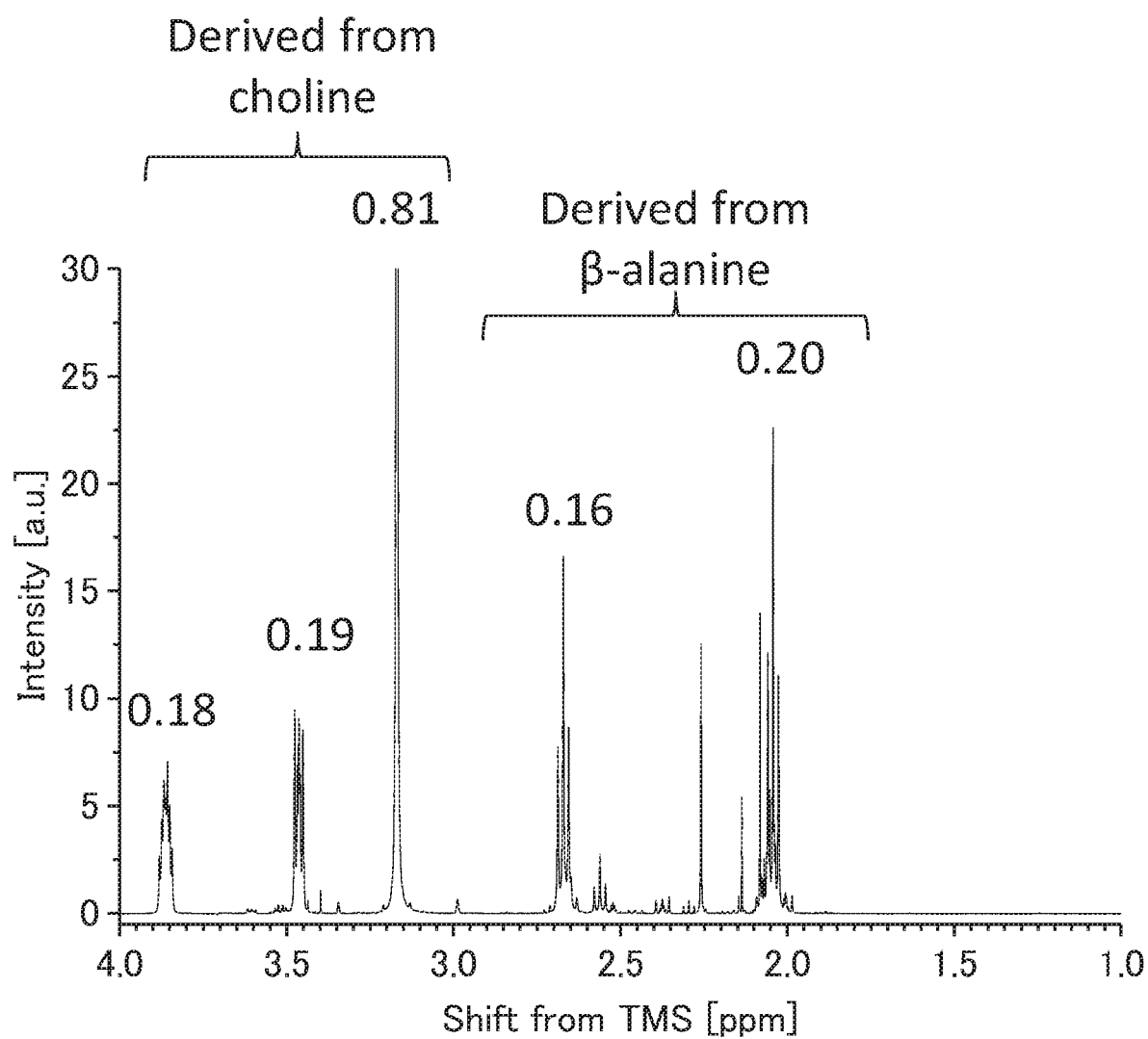
FIG. 1 shows a result of the nuclear magnetic resonance spectrum $^1$H-NMR measurement in the inventive example 1A.

Hereinafter, the embodiment of the present invention will be described.

The ionic liquid according to the present embodiment is represented by the following chemical formula (I).

$$[(CH_3)_3N(CH_2)_2OH]^+[NH_2\text{-}L\text{-}COO]^- \quad (I)$$

where L is $-(CH_2)_2-$ or $-(CH_2)_3-$.

The ionic liquid composition according to the present embodiment contains the ionic liquid represented by the chemical formula (I) and water. Unlike the disclosure of Non Patent Literature 1 and Non Patent Literature 2, the ionic liquid composition according to the present embodiment does not contain a cellulose-degrading enzyme (namely, an enzyme capable of hydrolyzing cellulose).

A molar ratio of $[(CH_3)_3N(CH_2)_2OH]^+$ to $[NH_2\text{-}L\text{-}COO]^-$ is not less than 0.86 and not more than 1.12.

A weight ratio of the water to the ionic liquid composition is not more than 4.7%.

As described later in more detail, cellulose is added to the ionic liquid composition according to the present embodiment. In this way, the cellulose is dissolved in the ionic liquid composition to provide a cellulose solution. Desirably, the cellulose has weight average molecular weight of not less than 30,000. More desirably, the cellulose has weight average molecular weight of not more than 500,000.

As well known, an ionic liquid is composed of a cation and an anion. In the present embodiment, the cation is a choline cation represented by the chemical formula $[(CH_3)_3N(CH_2)_2OH]^+$ (hereinafter, referred to as "[Ch]"). Choline is an aqueous nutrient essential for a human. In the present embodiment, the anion is represented by the chemical formula $[NH_2\text{-L-COO}]^-$. The linker L is a linker represented by the chemical formula $—(CH_2)_n—$ (where n=2 or 3). In other words, the anion is a β-alanine anion represented by the chemical formula $[NH_2—CH_2—CH_2—COO]^-$ or a γ-aminobutyric acid anion represented by the chemical formula $[NH_2—CH_2—CH_2—CH_2—COO]^-$. β-alanine and γ-aminobutyric acid are each one kind of amino acids. For simple expression, choline cation, β-alanine anion, and γ-aminobutyric acid anion may be represented by [Ch], [β-Ala], and [GABA] respectively in the present specification.

[Ch], [β-Ala], and [GABA] exist in a human body, and are materials having high safety for a living body for the reason of holding of matabolic pathway in a body and other reasons.

In addition, for the reason that hydrogen bonding strength of an amino group or a carboxyl group derived from β-alanine or γ-aminobutyric acid is greater than hydrogen bonding strength of OH groups between cellulose chains and other reasons, the ionic liquid according to the present disclosure is capable of weaking hydrogen bonds between the cellulose chains and the effect of improving solubility of cellulose is expected.

As one example, the ionic liquid represented by the chemical formula [Ch][β-Ala] may be synthesized on the basis of the following chemical reaction formula (II). As shown in the following chemical reaction formula (II), choline is mixed with β-alanine. The molar quantity of choline is as much as that of β-alanine. The mixture solution containing choline and β-alanine is heated under vacuume, and then dried to provide the ionic liquid represented by the chemical formula [Ch][β-Ala] through dehydration reaction between the hydroxyl ion of choline and the hydrogen ion of the carboxyl group of the β-alanine. The ionic liquid represented by the chemical formula [Ch][GABA] may also synthesized similarly.

[Chem. 1]

(II)

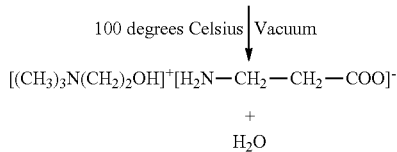

In the present embodiment, the molar ratio of $[(CH_3)_3N(CH_2)_2OH]^+$ to $[NH_2\text{-L-COO}]^-$ is not less than 0.86 and not more than 1.12. As is clear from the inventive examples and the comparative examples which will be described later, in case where the molar ratio is less than 0.86, cellulose fails to be dissolved in the ionic liquid composition within forty-eight hours. Also in case where the molar ratio is more than 1.12, cellulose fails to be dissolved in the ionic liquid composition within forty-eight hours.

A weight ratio of the water to the ionic liquid composition is not more than 4.7%. As is clear from the inventive examples and the comparative examples which will be described later, in case the weight ratio is more than 4.7%, cellulose fails to be dissolved in the ionic liquid composition within forty-eight hours. Time necessary for dissolving cellulose is also decreased with a decrease in the weight ratio. Therefore, it is desirable that the weight ratio is small. As one example, the lower limit of the weight ratio is 1.6%. However, cellulose may be dissolved even when the weight ratio is less than 1.6%. As is clear from the above chemical reaction formula (II), note that water is generated as by-product upon the synthesis of the ionic liquid.

As one embodiment, the ionic liquid composition according to the present embodiment dissolves cellulose within forty-eight hours, desirably, within twenty-four hours, after the cellulose is added to the ionic liquid composition according to the present embodiment. Unlike the disclosure of Non Patent Literature 1 and Non Patent Literature 2, a cellulose-degrading enzyme is not used. As is disclosed in Patent Literature 3, a cellulose film is formed from the ionic liquid composition to which the cellulose has been added, namely, from the cellulose solution.

It is desirable that the ionic liquid composition to which the cellulose has been added is heated in order to promote the dissolution. As one embodiment, the ionic liquid composition to which the cellulose has been added is heated at a temperature of not less than 70 degrees Celsius and not more than 100 degrees Celsius at a pressure of not less than 0.01 MPa and not more than 0.1 MPa for forty-eight hours.

The ionic liquid composition to which the cellulose has been added may be left at rest until the cellulose is dissolved in the ionic liquid composition. The ionic liquid composition to which the cellulose has been added may be stirred.

A kind of the cellulose dissoluble in the ionic liquid of the present disclosure is not limited particularly. For example, native cellulose derived from plant species, native cellulose of biological origin, regenerated cellulose such as cellophane, or artificial cellulose such as cellulose nanofiber may be applied. In addition, it does not depend on the crystalline state of original cellulose. In other words, it is known that cellulose has an I-type-IV-type crystalline structure or a non-crystalline structure. Cellulose having any structure may be dissolved.

The ionic liquid composition according to the present embodiment may contain the ionic liquid and other components. An example of the other components is an aprotic polar solvent. The ionic liquid composition according to the present embodiment is in a liquid state.

As described above, the ionic liquid composition according to the present embodiment may contain an aprotic polar solvent in order to control a viscosity thereof. An example of the aprotic polar solvent is dimethyl sulfoxide. The weight ratio of the aprotic polar solvent to the ionic liquid may be not less than 309%. In addition, the dimethyl sulfoxide may be added before, during, or after the dissolution of the cellulose.

Unlike the disclosure of Non Patent Literature 1 and Non Patent Literature 2, the ionic liquid composition according to the present embodiment does not contain cellulose-degrading enzyme.

EXAMPLES

Hereinafter, the present invention will be described in more detail with reference to the following examples.

Experiment 1

The experiment 1 is composed of inventive examples 1A-1H and comparative examples 1A-1D. In the experiment 1, the cation was derived from choline and the anion was derived from β-alanine.

Inventive Example 1A

β-alanine (available from Tokyo Chemical Industry Co., Ltd., 8.9 grams, 100 millimoles) was mixed with a choline aqueous solution (available from Tokyo Chemical Industry Co., Ltd., 24.7 grams, 100 millimoles) to provide a mixture solution. The mixture solution was dried at a temperature of 100 degrees Celsius under reduced pressure for three hours. In this way, an ionic liquid composition containing an ionic liquid represented by the chemical formula [Ch][β-Ala] was provided.

The thus-provided [Ch][β-Ala] ionic liquid composition was confirmed by using nuclear magnetic resonance spectrum measurement. Please note that the structure of the ionic liquid composition fabricated in the present example were determined with nuclear magnetic resonance spectrum (measured with Inova-400 made by Varian company, 400 MHz: $^1$H-NMR). The measurement was conducted using deuterated DMSO and indicated with δ value (ppm) when tetramethyl silane (i.e., TMS) was an internal standard. FIG. 1 shows a result of the nuclear magnetic resonance spectrum $^1$H-NMR measurement.

In addition, a water amount contained in the [Ch][β-Ala] ionic liquid composition (500 milligrams) was measured by Karl Fischer's method. In this method, the weight of the [Ch][β-Ala] ionic liquid composition was measured three times to calculate the average weight thereof, and then this ionic liquid composition was injected to a moisture measurement device CA-100 (available from Mitsubishi Chemical Analytech Co., Ltd). The weight of the residual moisture was measured and a water ratio was calculated by dividing by the weight of the ionic liquid composition. As a result, the water amount of the [Ch][β-Ala] ionic liquid composition was 1.7% (8.5 milligrams).

The [Ch][β-Ala] ionic liquid composition having a weight of 0.97 grams was supplied to a glass bottle. Cellulose (0.03 grams, available from Sigma-Aldrich, trade name: Avicel PH-101, average molecular weight measured by a gel-permeation chromatography—multi angle light scattering method: approximately 30,000) was added to the glass bottle. The solution was left at rest at a temperature of 90 degrees Celsius at a pressure of 0.02 MPa. The present inventors observed visually whether or not the added cellulose was dissolved in the [Ch][β-Ala] ionic liquid composition. As a result, after fifteen hours elapsed from the mixture of the ionic liquid composition and the cellulose, the cellulose was dissolved in the [Ch][β-Ala] ionic liquid composition. Furthermore, as a basis that the peak derived from the crystalline property of the cellulose disappeared in the X-ray diffraction analysis result, the present inventors also confirmed the dissolution of the cellulose.

The ratio of the [Ch] cation to the [β-Ala] anion in the provided [Ch][β-Ala] ionic liquid composition was measured as below. In the $^1$H-NMR spectrum shown in FIG. 1, three peaks each having a shift value of not less than 3.0 are derived from choline. The values of area ratio of the three peaks are 0.18, 0.19, and 0.81. A choline molecular has fourteen hydrogen atoms. However, one hydroxyl group included in the choline molecular does not appear in the $^1$H-NMR spectrum. Therefore, in FIG. 1, the thirteen hydrogen atoms included in the choline molecular appear. On the other hand, two peaks each having a shift value of less than 3.0 are derived from β-alanine. The values of area ratio of these two peaks are 0.16 and 0.20. One β-alanine anion has six hydrogen atoms. However, two hydrogen atoms included in the amino acid group included in the β-alanine molecule do not appear in the $^1$H-NMR spectrum. Therefore, in FIG. 1, four hydrogen atoms included in the β-alanine molecular appears.

As is well known, the area of $^1$H-NMR is proportional to the number of the hydrogen atoms. Therefore, the ratio of the [Ch] cation to the [β-Ala] anion included in the [Ch][β-Ala] ionic liquid composition is calculated on the basis of the following mathematical formula (X). Hereinafter, the ratio is referred to as "RCA".

RCA=((the sum total of the area ratio of the peaks derived from the cation)/(the number of the hydrogen atom(s) which is/are included in the cation and appear(s) in the $^1$H-NMR spectrum))/((the sum total of the area ratio of the peaks derived from the anion)/(the number of the hydrogen atom(s) which is/are included in the anion and appear(s) in the $^1$H-NMR spectrum)) (X)

In the inventive example 1 (namely, in FIG. 1), the sum total of the area ratio of the peaks derived from the cation (i.e., choline)=0.18+0.19+0.81=1.18 the number of the hydrogen atoms which are included in the cation (i.e., choline) and appear in the $^1$H-NMR spectrum=13 the sum total of the area ratio of the peaks derived from the anion (i.e., β-alanine)=0.16+0.20=0.36 the number of the hydrogen atoms which are included in the anion (i.e., β-alanine) and appear in the $^1$H-NMR spectrum=4

Therefore, the value of RCA is calculated to be approximately 1.01, as shown in the following mathematical formula.

RCA=(1.18/13)/(0.36/4)=approximately 1.01

Inventive Example 1B

Figure 2:
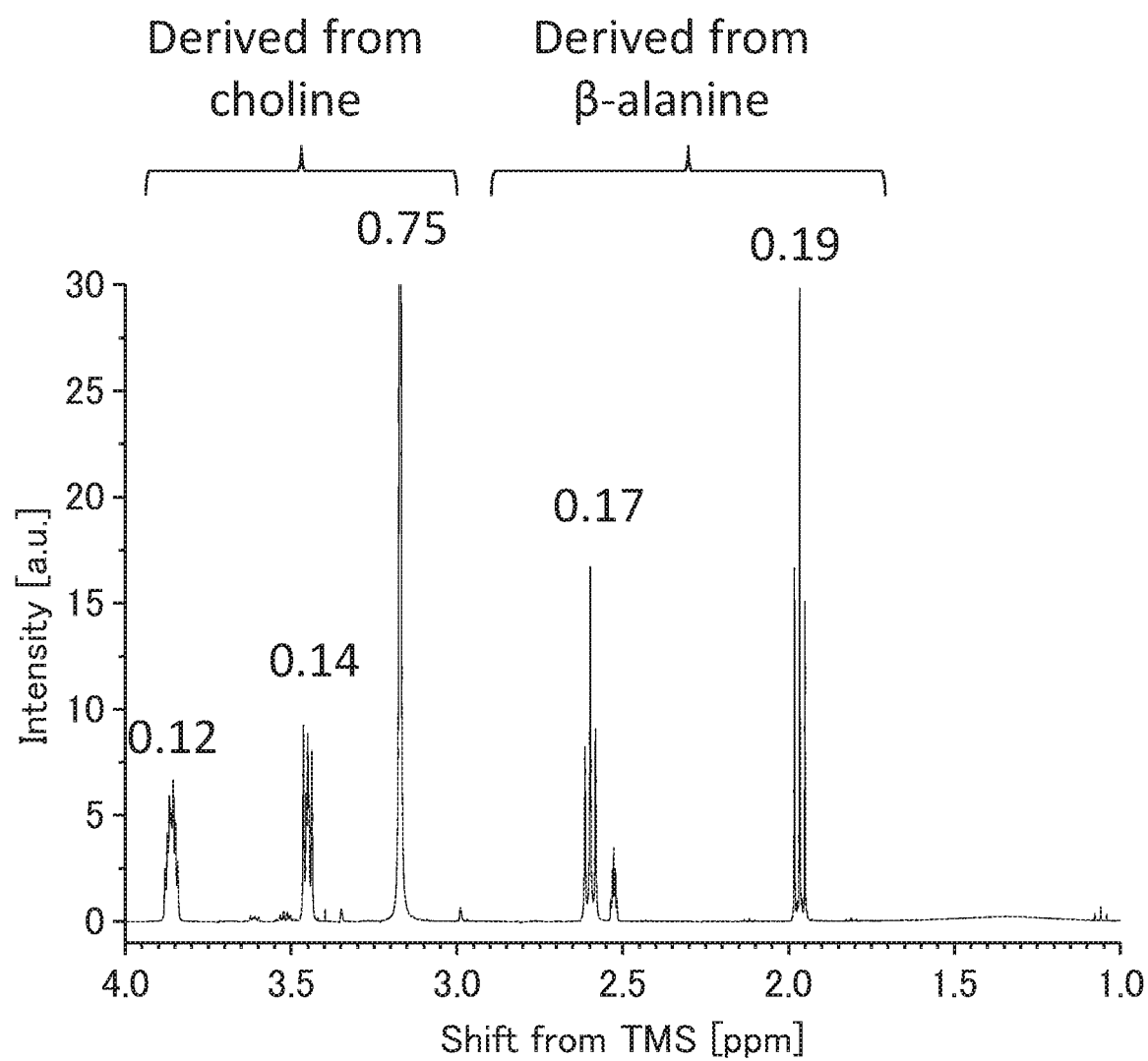
FIG. 2 shows a result of the nuclear magnetic resonance spectrum $^1$H-NMR measurement in the inventive example 1B.

In the inventive example 1B, an experiment similar to the inventive example 1A was conducted, except that the weight of the β-alanine was 10.2 grams (approximately, 0.115 moles). FIG. 2 shows a result of the nuclear magnetic resonance spectrum $^1$H-NMR measurement in the inventive example 1B. The value of RCA calculated on the basis of FIG. 2 was 0.86. In the inventive example 1B, the cellulose was dissolved after fifteen hours elapsed from the mixture of the ionic liquid composition and the cellulose.

Inventive Example 1C

Figure 3:
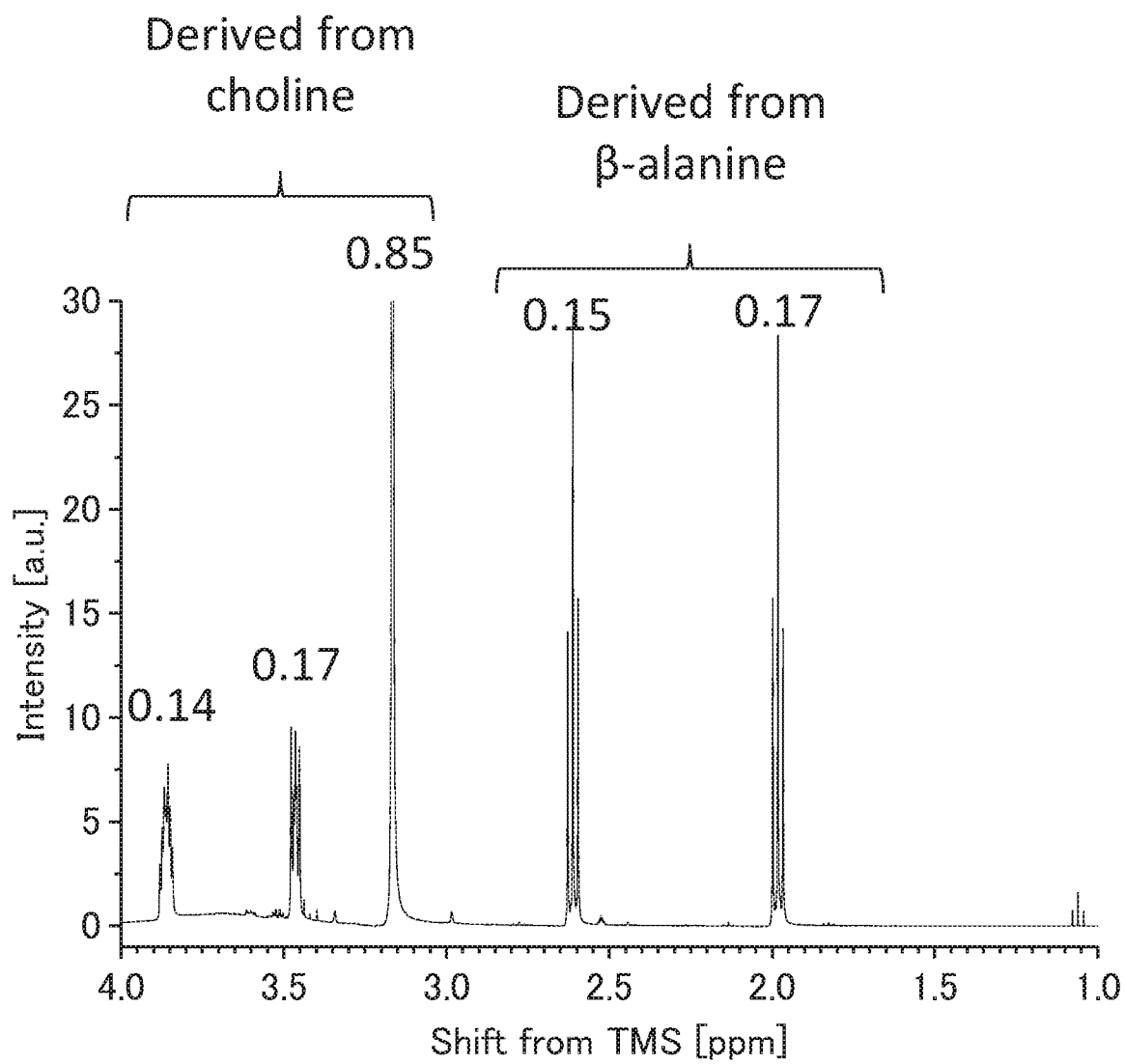
FIG. 3 shows a result of the nuclear magnetic resonance spectrum $^1$H-NMR measurement in the inventive example 10.

In the inventive example 1C, an experiment similar to the inventive example 1A was conducted, except that the weight of the β-alanine was 7.9 grams (approximately, 0.089 moles). FIG. 3 shows a result of the nuclear magnetic resonance spectrum $^1$H-NMR measurement in the inventive example 1C. The value of RCA calculated on the basis of FIG. 3 was 1.12. In the inventive example 10, the cellulose was dissolved after fifteen hours elapsed from the mixture of the ionic liquid composition and the cellulose.

Inventive Example 1D

In the inventive example 1 D, an experiment similar to the inventive example 1A was conducted, except of using bleached pulp made from wood (average molecular weight: approximately 300,000-500,000) in place of the cellulose (trade name: Avicel). In the inventive example 1 D, the cellulose was dissolved after forty-eight hours elapsed from the mixture of the ionic liquid composition and the cellulose.

Inventive Example 1E

In the inventive example 1E, an experiment similar to the inventive example 1A was conducted, except that the ionic liquid composition (0.97 grams) according to the inventive example 1A further contained water (0.029 grams, 4.7 weight percent) and except of using bleached pulp made from wood (average molecular weight: approximately 300,000-500,000) in place of the cellulose (trade name: Avicel). In the inventive example 1E, the cellulose was dissolved after forty-eight hours elapsed from the mixture of the ionic liquid composition and the cellulose.

Comparative Example 1A

Figure 4:
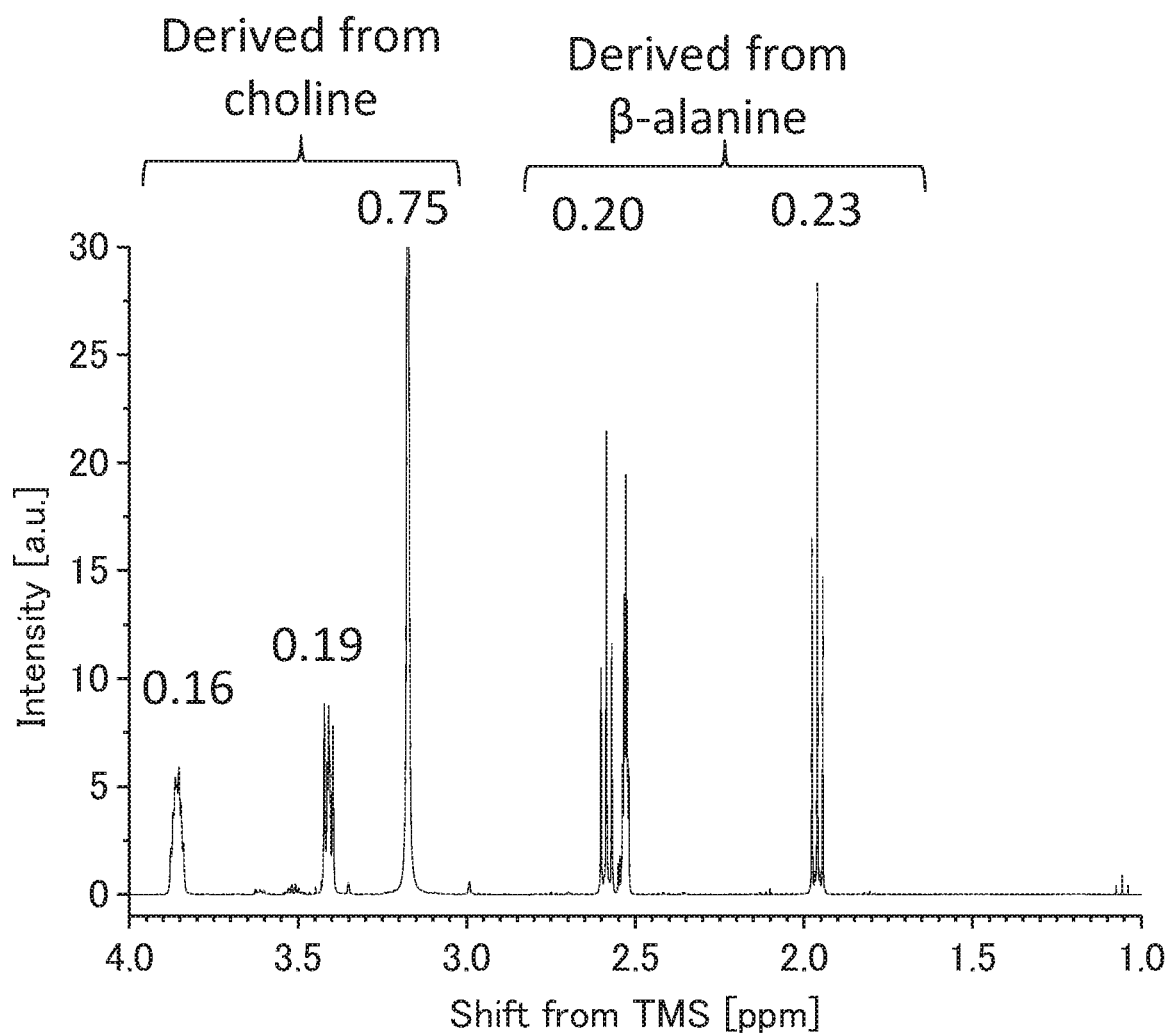
FIG. 4 shows a result of the nuclear magnetic resonance spectrum $^1$H-NMR measurement in the comparative example 1A.

In the comparative example 1A, an experiment similar to the inventive example 1A was conducted, except that the weight of β-alanine was 11.0 grams (approximately, 0.123 moles). FIG. 4 shows a result of the nuclear magnetic resonance spectrum $^1$H-NMR measurement in the comparative example 1A. The value of RCA calculated on the basis of FIG. 4 was 0.79. In the comparative example 1A, the cellulose was not dissolved.

Comparative Example 1B

Figure 5:
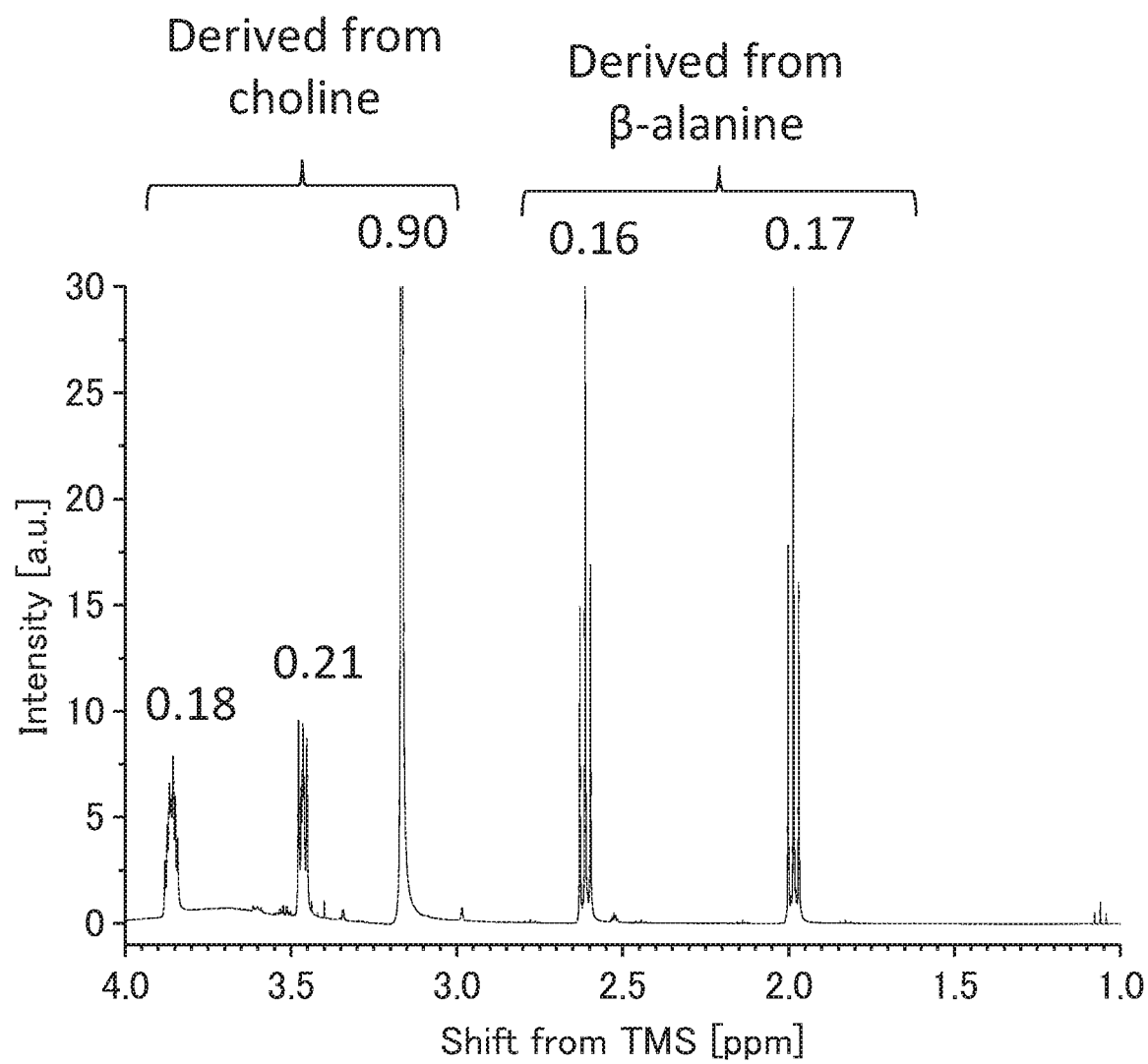
FIG. 5 shows a result of the nuclear magnetic resonance spectrum $^1$H-NMR measurement in the comparative example 1B.

In the comparative example 1B, an experiment similar to the inventive example 1A was conducted, except that the weight of β-alanine was 7.5 grams (approximately, 0.084 moles). FIG. 5 shows a result of the nuclear magnetic resonance spectrum $^1$H-NMR measurement in the comparative example 1B. The value of RCA calculated on the basis of FIG. 5 was 1.19. In the comparative example 1B, the cellulose was not dissolved, even after two hundred and forty hours elapsed from the mixture of the ionic liquid composition and the cellulose.

Comparative Example 1C

In the comparative example 1C, an experiment similar to the inventive example 1A was conducted, except that the ionic liquid composition (0.97 grams) according to the inventive example 1A further contained water (0.049 grams, 6.7 weight percent) and except of using bleached pulp made from wood (average molecular weight: approximately 300,000-500,000) in place of the cellulose (trade name: Avicel). In the comparative example 1C, the cellulose was not dissolved, even after two hundred and forty hours elapsed from the mixture of the ionic liquid composition and the cellulose.

The following Table 1 shows the results of the above inventive example 1A—the comparative example 1C.

TABLE 1

(Composition: [Ch][β-Ala])

| | The value of RCA | Water Amount | Results |
|---|---|---|---|
| Comparative example 1A | 0.79 | 1.7% | Not dissolved even after 240 hours elapsed from the mixture |
| Inventive example 1B | 0.86 | 1.8% | Dissolved after 15 hours elapsed from mixture |
| Inventive example 1A | 1.01 | 1.7% | Dissolved after 15 hours elapsed from mixture |
| Inventive example 1C | 1.12 | 2.0% | Dissolved after 15 hours elapsed from mixture |
| Comparative example 1B | 1.19 | 1.9% | Not dissolved even after 240 hours elapsed from the mixture |
| Inventive example 1D | 1.01 | 1.7% | Dissolved after 48 hours elapsed from mixture |
| Inventive example 1E | 1.01 | 4.7% | Dissolved after 48 hours elapsed from mixture |
| Comparative example 1C | 1.01 | 6.7% | Not dissolved even after 240 hours elapsed from the mixture |

The value of RCA: molar ratio of [Ch]/[β-Ala]
Water Amount: the value calculated in accordance with Karl Fischer's method, defined according to water weight/ionic liquid composition weight As is clear from Table 1, if the value of RCA is not less than 0.86 and not more than 1.12, cellulose was dissolved in the ionic liquid composition within 48 hours after the mixture of the ionic liquid composition and the cellulose. On the other hand, if the value of RCA is less than approximately 0.86 or more than approximately 1.12, the cellulose is not dissolved in the ionic liquid composition even after 240 hours.

Furthermore, if the water amount is not more than 4.7%, the cellulose was dissolved in the ionic liquid composition within 48 hours after the mixture of the ionic liquid composition and the cellulose. On the other hand, if the water amount is not less than 6.7%, the cellulose was not dissolved in the ionic liquid composition even after 240 hours.

It is obvious that a cellulose-degrading enzyme was not used in the above experiment.

Inventive Example 1H

In the inventive example 1H, dimethyl sulfoxide (hereinafter, referred to as "DMSO", 1.00 gram, the weight ratio thereof to the ionic liquid [Ch][β-Ala]: 103%) was added to the cellulose solution (1.00 gram) provided in the inventive example 1 D. Then, this solution was left at rest at a temperature of 90 degrees Celsius at normal pressures for 48 hours. The present inventors observed visually whether or not the cellulose and the DMSO were dissolved in each other.

Inventive Example 1I

In the inventive example 1I, an experiment similar to the inventive example 1H was conducted, except of addition of 2.00 grams of DMSO (the weight ratio thereof to the ionic liquid [Ch][β-Ala]:206%)

Inventive Example 1J

In the inventive example 1J, an experiment similar to the inventive example 1H was conducted, except of addition of 3.00 grams of DMSO (the weight ratio thereof to the ionic liquid [Ch][β-Ala]:309%)

Comparative Example 1D

In the comparative example 1 D, an experiment similar to the inventive example 1H was conducted, except of addition of 4.00 grams of DMSO (the weight ratio thereof to the ionic liquid [Ch][β-Ala]:412%)

The following Table 2 shows the results of the above inventive example 1H—the comparative example 1 D.

TABLE 2

| | Weight ratio of DMSO to [Ch][β-Ala] | Result |
|---|---|---|
| Inventive Example 1F | 103 | Dissolved in each other |
| Inventive Example 1G | 206 | Dissolved in each other. |
| Inventive Example 1H | 309 | Dissolved in each other |
| Comparative Example 1D | 412 | Cellulose was precipitated. |

As is clear from Table 2, if the weight ratio of the DMSO to the ionic liquid represented by [Ch][β-Ala] is not more than 309%, the DMSO and the ionic liquid were dissolved in each other within 48 hours. On the other hand, if the weight ratio of the DMSO is not less than 412%, the cellulose was precipitated within 48 hours. As just described, when the DMSO having a weight ratio of not more than 309% is added to the cellulose solution in which cellulose has been dissolved in the ionic liquid [CH][β-Ala], the DMSO and the cellulose were dissolved in each other without the precipitation of the cellulose within 48 hours.

Experiment 2

The experiment 2 is composed of inventive examples 2A-2H and comparative examples 2A-2D. In the experiment 2, the cation was derived from choline and the anion was derived from γ-aminobutyric acid.

Inventive Example 2A

γ-aminobutyric acid (available from Wako Pure Chemical Industries, Ltd., 10.3 grams, 100 millimoles) was mixed with a choline aqueous solution (available from Tokyo Chemical Industry Co., Ltd., 24.7 grams, 100 millimoles) to provide a mixture solution. The mixture solution was dried at a temperature of 100 degrees Celsius under reduced pressure for three hours. In this way, an ionic liquid composition containing [Ch][GABA] ionic liquid was provided. Similarly to the case of the inventive example 1A, the provided [Ch][GABA] ionic liquid composition was confirmed by using nuclear magnetic resonance spectrum measurement. The water amount of the [Ch][GABA] ionic liquid composition was 1.6% (8.0 milligrams).

Figure 6:
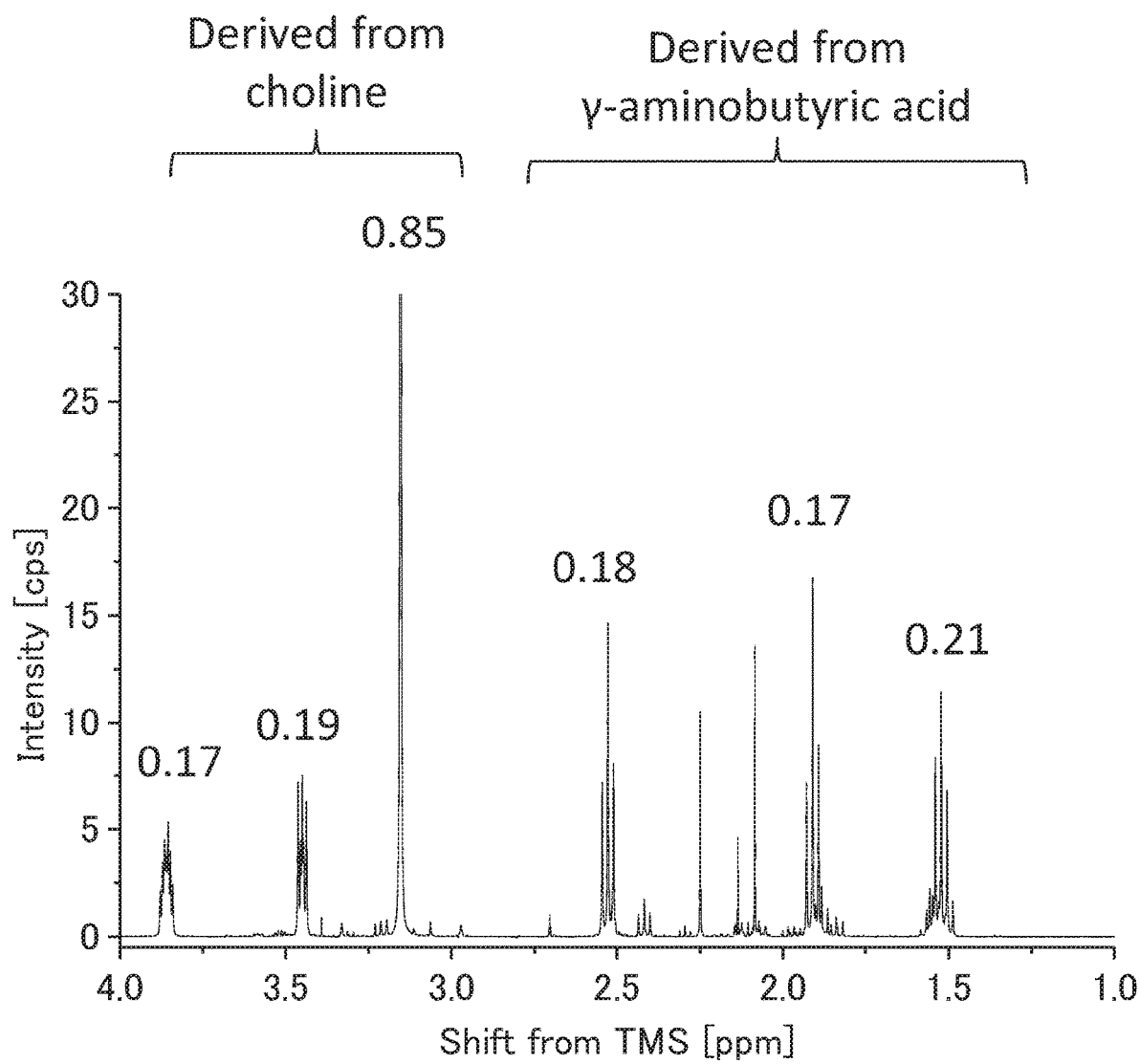
FIG. 6 shows a result of the nuclear magnetic resonance spectrum $^1$H-NMR measurement in the inventive example 2A.

FIG. 6 shows a result of the nuclear magnetic resonance spectrum $^1$H-NMR measurement in the inventive example 2A. The value of RCA calculated on the basis of FIG. 6 was 1.00. In the inventive example 2A, the cellulose was dissolved. Furthermore, as a basis that the peak derived from the crystalline property of the cellulose disappeared in the X-ray diffraction analysis result, the present inventors also confirmed the dissolution of the cellulose.

Inventive Example 2B

Figure 7:
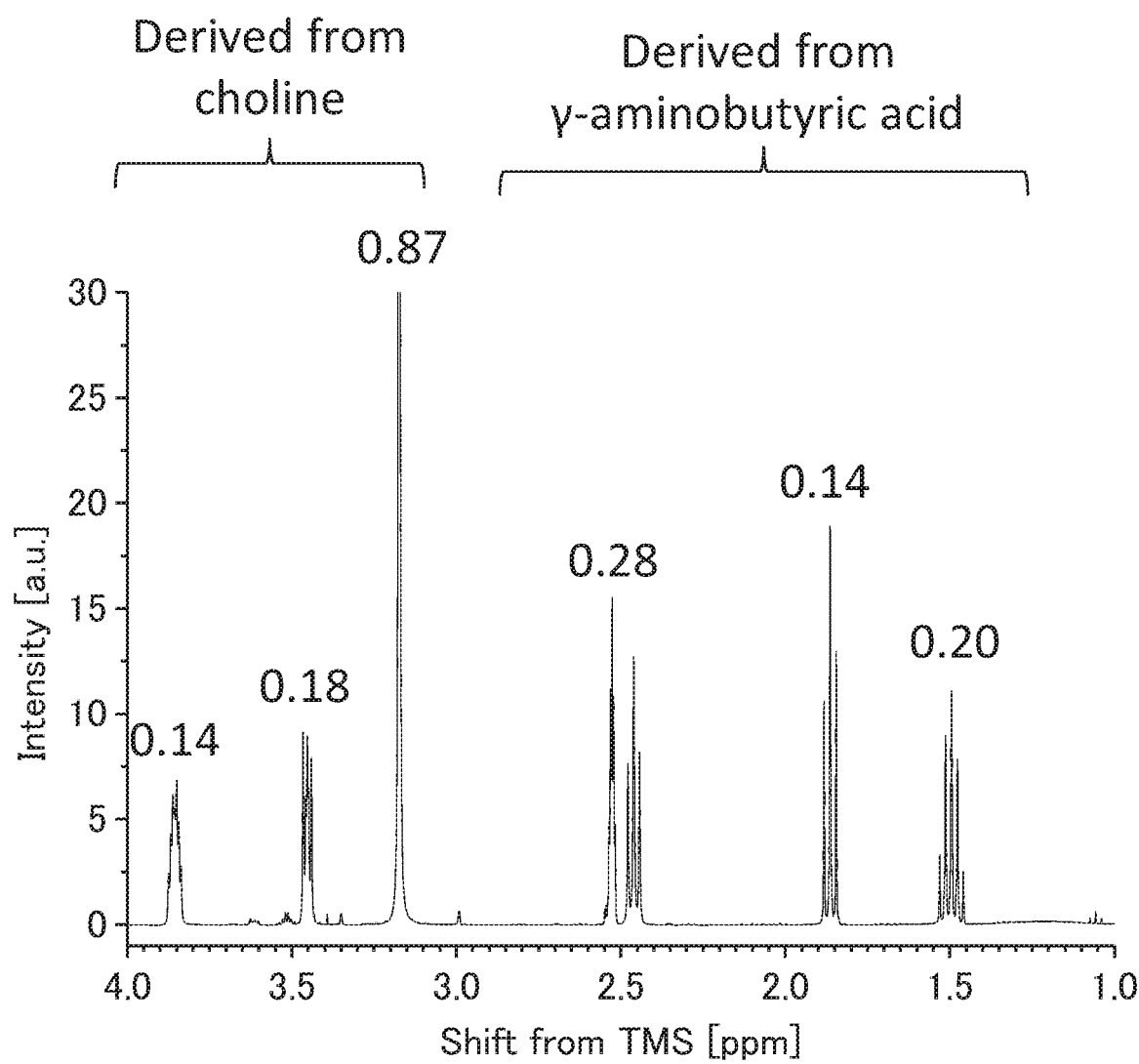
FIG. 7 shows a result of the nuclear magnetic resonance spectrum $^1$H-NMR measurement in the inventive example 2B.

In the inventive example 2B, an experiment similar to the inventive example 2A was conducted, except that the weight of the γ-aminobutyric acid was 11.5 grams (approximately, 112 millimoles). FIG. 7 shows a result of the nuclear magnetic resonance spectrum $^1$H-NMR measurement in the inventive example 2B. The value of RCA calculated on the basis of FIG. 7 was 0.89. In the inventive example 2B, the cellulose was dissolved after thirteen hours elapsed from the mixture of the ionic liquid composition and the cellulose.

Inventive Example 2C

Figure 8:
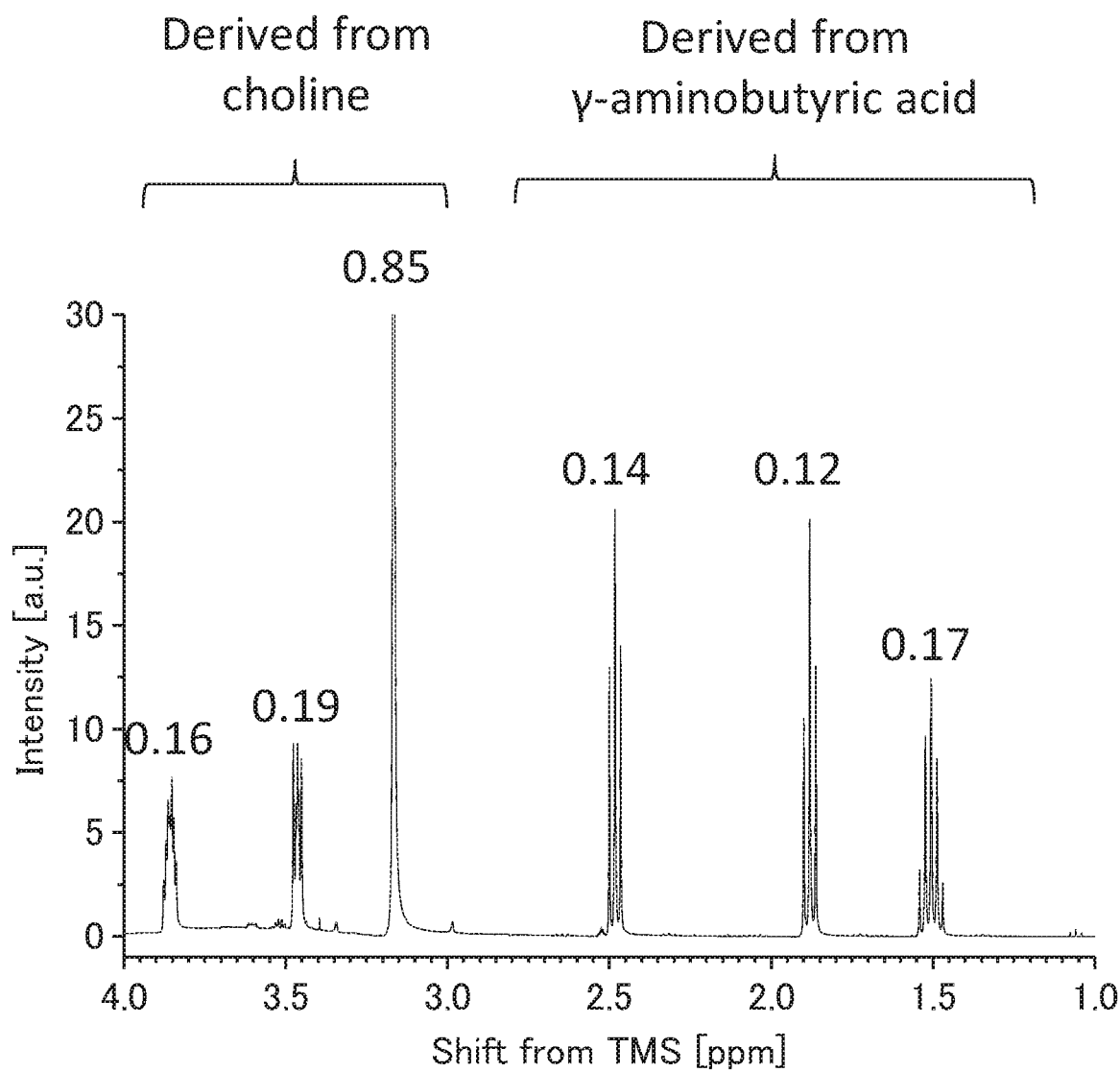
FIG. 8 shows a result of the nuclear magnetic resonance spectrum $^1$H-NMR measurement in the inventive example 2C.

In the inventive example 2C, an experiment similar to the inventive example 2A was conducted, except that the weight of the γ-aminobutyric acid was 9.1 grams (approximately, 88 millimoles). FIG. 8 shows a result of the nuclear magnetic resonance spectrum $^1$H-NMR measurement in the inventive example 2C. The value of RCA calculated on the basis of FIG. 8 was 1.10. In the inventive example 2C, the cellulose was dissolved after thirteen hours elapsed from the mixture of the ionic liquid composition and the cellulose.

Inventive Example 2D

In the inventive example 2D, an experiment similar to the inventive example 2A was conducted, except of using bleached pulp made from wood (average molecular weight: approximately 300,000-500,000) in place of the cellulose (trade name: Avicel). In the inventive example 2D, the cellulose was dissolved after forty-four hours elapsed from the mixture of the ionic liquid composition and the cellulose.

Inventive Example 2E

In the inventive example 2E, an experiment similar to the inventive example 2A was conducted, except that the ionic liquid composition (0.97 grams) according to the inventive example 2A further contained water (0.029 grams, 4.6 weight percent) and except of using bleached pulp made from wood (average molecular weight: approximately 300,000-500,000) in place of the cellulose (trade name: Avicel). In the inventive example 2E, the cellulose was dissolved after forty-four hours elapsed from the mixture of the ionic liquid composition and the cellulose.

Comparative Example 2A

Figure 9:
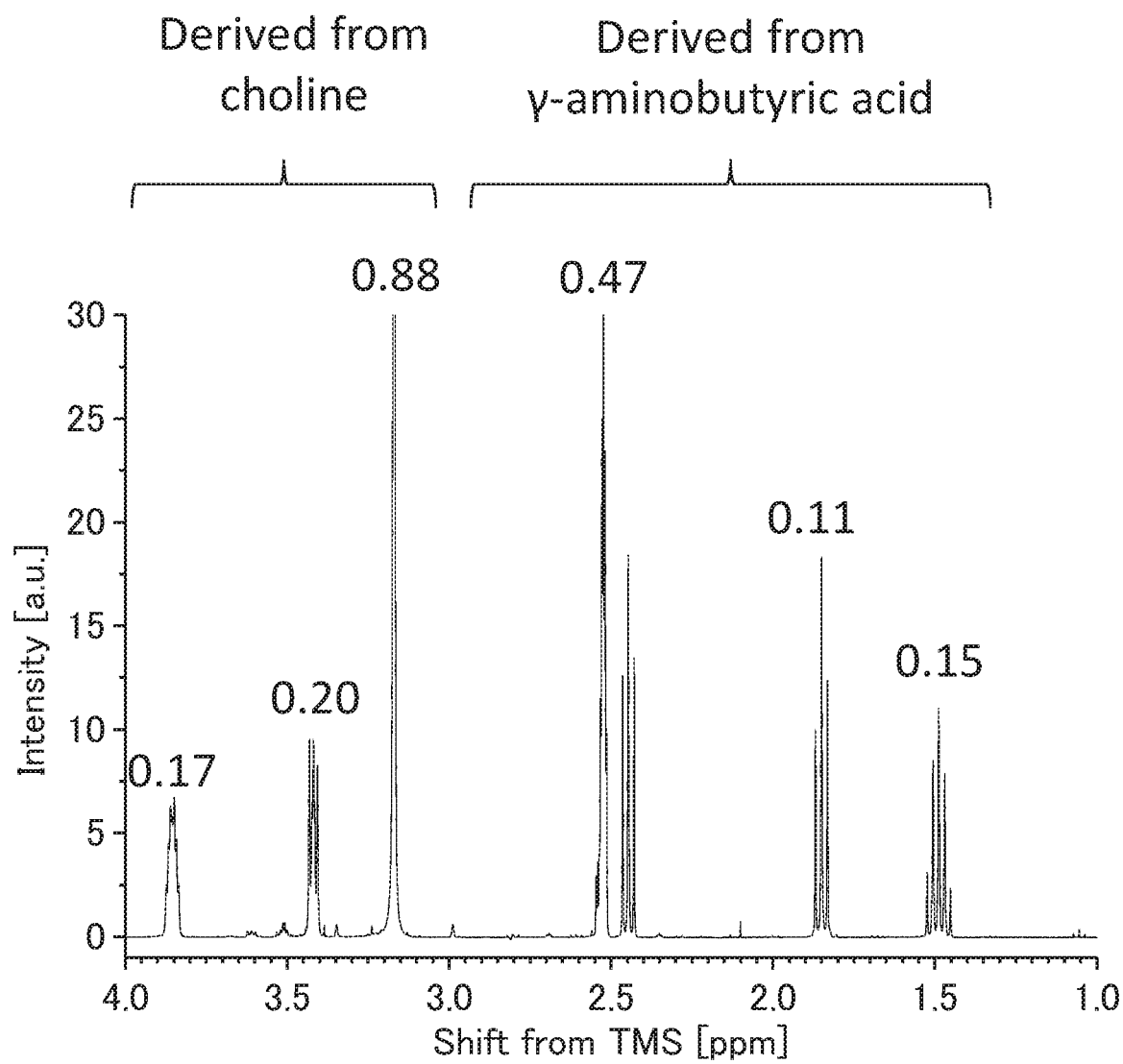
FIG. 9 shows a result of the nuclear magnetic resonance spectrum $^1$H-NMR measurement in the comparative example 2A.

In the comparative example 2A, an experiment similar to the inventive example 2A was conducted, except that the weight of γ-aminobutyric acid was 12.8 grams (approximately, 124 millimoles). FIG. 9 shows a result of the nuclear magnetic resonance spectrum $^1$H-NMR measurement in the comparative example 2A. The value of RCA calculated on the basis of FIG. 9 was 0.79. In the comparative example 2A, the cellulose was not dissolved.

Comparative Example 2B

Figure 10:
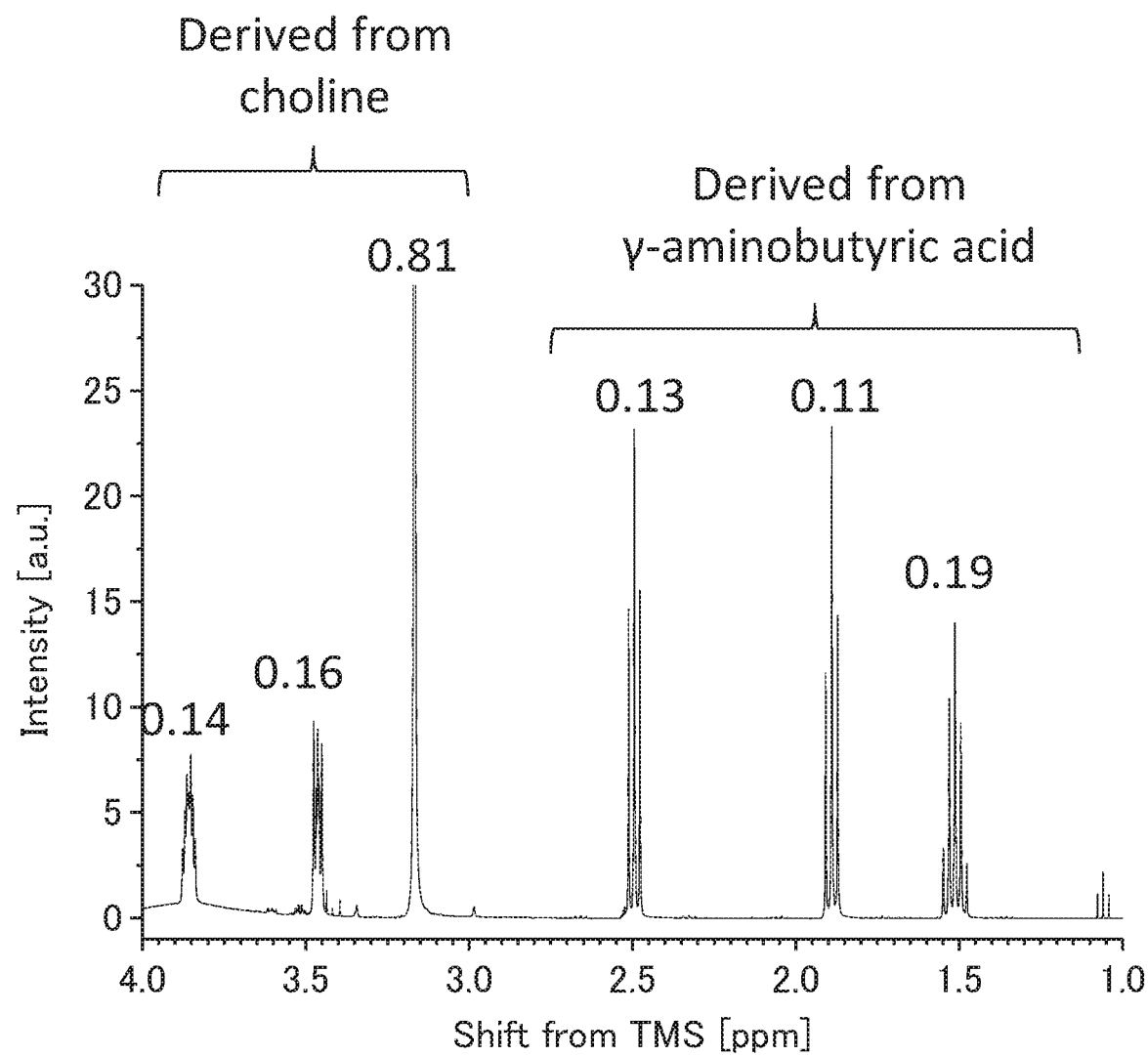
FIG. 10 shows a result of the nuclear magnetic resonance spectrum $^1$H-NMR measurement in the comparative example 2B.

In the comparative example 2B, an experiment similar to the inventive example 2A was conducted, except that the weight of γ-aminobutyric acid was 7.0 grams (approximately, 67.8 millimoles). FIG. 10 shows a result of the nuclear magnetic resonance spectrum $^1$H-NMR measurement in the comparative example 2B. The value of RCA calculated on the basis of FIG. 10 was 1.19. In the comparative example 2B, the cellulose was not dissolved, even after two hundred and forty hours elapsed from the mixture of the ionic liquid composition and the cellulose.

Comparative Example 2C

In the comparative example 2C, an experiment similar to the inventive example 2A was conducted, except that the ionic liquid composition (0.97 grams) according to the inventive example 2A further contained water (0.049 grams, 6.6 weight percent) and except of using bleached pulp made from wood (average molecular weight: approximately 300,000-500,000) in place of the cellulose (trade name: Avicel). In the comparative example 2C, the cellulose was not dissolved, even after two hundred and forty hours elapsed from the mixture of the ionic liquid composition and the cellulose.

The following Table 3 shows the results of the above inventive example 2A—the comparative example 2C.

TABLE 3

(Composition: [Ch][GABA])

| | The value of RCA | Water Amount | Results |
|---|---|---|---|
| Comparative Example 2A | 0.79 | 1.9% | Not dissolved even after 240 hours elapsed from the mixture |
| Inventive Example 2B | 0.89 | 1.4% | Dissolved after 13 hours elapsed from mixture |
| Inventive Example 2A | 1.00 | 1.6% | Dissolved after 13 hours elapsed from mixture |
| Inventive Example 2C | 1.10 | 1.7% | Dissolved after 13 hours elapsed from mixture |
| Comparative Example 2B | 1.19 | 1.9% | Not dissolved even after 240 hours elapsed from the mixture |
| Inventive Example 2D | 1.00 | 1.8% | Dissolved after 44 hours elapsed from mixture |
| Inventive Example 2E | 1.00 | 4.6% | Dissolved after 44 hours elapsed from mixture |
| Comparative Example 2C | 1.00 | 6.6% | Not dissolved even after 240 hours elapsed from the mixture |

The value of RCA: molar ratio of [Ch]/[GABA]
Water Amount: the value calculated in accordance with Karl Fischer's method, defined according to water weight/ionic liquid composition weight As is clear from Table 3, if the value of RCA is not less than 0.89 and not more than 1.10, cellulose was dissolved in the ionic liquid composition within 44 hours after the mixture of the ionic liquid composition and the cellulose. On the other hand, if the value of RCA is less than 0.89 or more than 1.10, the cellulose is not dissolved in the ionic liquid composition even after 240 hours.

Furthermore, if the water amount is not more than 4.6%, the cellulose was dissolved in the ionic liquid composition within 48 hours after the mixture of the ionic liquid composition and the cellulose. On the other hand, if the water amount is not less than 6.6%, the cellulose was not dissolved in the ionic liquid composition even after 240 hours.

It is obvious that a cellulose-degrading enzyme was not used in the above experiment.

Inventive Example 2F

In the inventive example 2F, dimethyl sulfoxide (hereinafter, referred to as "DMSO", 1.00 gram, the weight ratio thereof to the ionic liquid [Ch][GABA]: 103%) was added to the cellulose solution (1.00 gram) provided in the inventive example 2D. Then, this solution was left at rest at a temperature of 90 degrees Celsius at normal pressures for 48 hours. The present inventors observed visually whether or not the cellulose and the DMSO were dissolved in each other.

Inventive Example 2G

In the inventive example 2G, an experiment similar to the inventive example 2F was conducted, except of addition of 2.00 grams of DMSO (the weight ratio thereof to the ionic liquid [Ch][GABA]: 206%)

Inventive Example 2H

In the inventive example 2H, an experiment similar to the inventive example 2F was conducted, except of addition of 3.00 grams of DMSO (the weight ratio thereof to the ionic liquid [Ch][GABA]:309%)

Comparative Example 2D

In the comparative example 2D, an experiment similar to the inventive example 2F was conducted, except of addition of 4.00 grams of DMSO (the weight ratio thereof to the ionic liquid [Ch][GABA]: 412%)

The following Table 4 shows the results of the above inventive example 2F—the comparative example 2D.

TABLE 4

| | Weight ratio of DMSO to [Ch][GABA] | Result |
|---|---|---|
| Inventive Example 2F | 103 | Dissolved in each other |
| Inventive Example 2G | 206 | Dissolved in each other. |
| Inventive Example 2H | 309 | Dissolved in each other |
| Comparative Example 2D | 412 | Cellulose was precipitated. |

As is clear from Table 4, if the weight ratio of the DMSO to the ionic liquid represented by [Ch][GABA] is not more than 309%, the DMSO and the ionic liquid were dissolved in each other within 48 hours. On the other hand, if the weight ratio of the DMSO is not less than 412%, the cellulose was precipitated within 48 hours. As just described, when the DMSO having a weight ratio of not more than 309% is added to the cellulose solution in which cellulose has been dissolved in the ionic liquid [CH][GABA], the DMSO and the cellulose were dissolved in each other without the precipitation of the cellulose within 48 hours.

INDUSTRIAL APPLICABILITY

The present invention provides an ionic liquid composition capable of dissolving cellulose without an cellulose-degrading enzyme, namely, an enzyme capable of hydrolyzing cellulose.

The invention claimed is:

1. A solution in which cellulose has been dissolved in an ionic liquid, wherein the ionic liquid is represented by the following chemical formula (I):

where L is —$(CH_2)_2$— or —$(CH_2)_3$—.

2. The solution according to claim 1, wherein L is —$(CH_2)_2$—.

3. The solution according to claim 1, wherein L is —$(CH_2)_3$—.

4. A solution in which cellulose has been dissolved in an ionic liquid composition, wherein
the ionic liquid composition containing:
an ionic liquid; and
water,
the ionic liquid is represented by the following chemical formula (I):

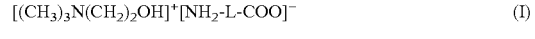

where L is —(CH$_2$)$_2$— or —(CH$_2$)$_3$—;
a molar ratio of [(CH$_3$)$_3$N(CH$_2$)$_2$OH]$^+$ to [NH$_2$-L-COO]$^-$ is not less than 0.86 and not more than 1.12; and
a weight ratio of the water to the ionic liquid composition is not more than 4.7%.

5. The solution according to claim 4, wherein the ionic liquid composition does not contain an enzyme capable of hydrolyzing cellulose.

6. The solution according to claim 4, wherein the molar ratio of [(CH$_3$)$_3$N(CH$_2$)$_2$OH]$^+$ to [NH$_2$-L-COO]$^-$ is not less than 0.89 and not more than 1.10.

7. The solution according to claim 4, wherein the weight ratio of the water to the ionic liquid composition is not less than 1.6%.

8. The solution according to claim 4, further containing: an aprotic polar solvent.

9. The solution according to claim 4, wherein the aprotic polar solvent is dimethyl sulfoxide.

10. The solution according to claim 4, wherein a weight ratio of the dimethyl sulfoxide to the ionic liquid is not more than 309%.

11. The solution according to claim 4, wherein L is —(CH$_2$)$_2$—.

12. The solution according to claim 4, wherein L is —(CH$_2$)$_3$—.

13. A method for dissolving cellulose, the method comprising:
(a) adding cellulose to an ionic liquid composition; wherein
the ionic liquid composition contains an ionic liquid and water;
the ionic liquid is represented by the following chemical formula (I):

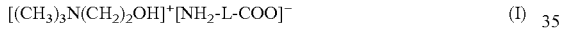 (I)

where L is —(CH$_2$)$_2$— or —(CH$_2$)$_3$—;
a molar ratio of [(CH$_3$)$_3$N(CH$_2$)$_2$OH]$^+$ to [NH$_2$-L-COO]$^-$ is not less than 0.86 and not more than 1.12; and
a weight ratio of the water to the ionic liquid composition is not more than 4.7%.

14. The method according to claim 13, wherein the ionic liquid composition does not contain an enzyme capable of hydrolyzing cellulose.

15. The method according to claim 13, wherein the molar ratio of [(CH$_3$)$_3$N(CH$_2$)$_2$OH]$^+$ to [NH$_2$-L-COO]$^-$ is not less than 0.89 and not more than 1.10.

16. The method according to claim 13, wherein the weight ratio of the water to the ionic liquid composition is not less than 1.6%.

17. The method according to claim 13, further comprising:
(b1) heating the ionic liquid composition to which the cellulose has been added to dissolve the cellulose in the ionic liquid composition, after the step (a).

18. The method according to claim 13, further comprising:
(b2) leaving the ionic liquid composition to which the cellulose has been added at rest to dissolve the cellulose in the ionic liquid composition, after the step (a).

19. The method according to claim 13, further comprising:
(b3) stirring the ionic liquid composition to which the cellulose has been added to dissolve the cellulose in the ionic liquid composition, after the step (a).

20. The method according to claim 13, wherein the ionic liquid composition further contains an aprotic polar solvent.

21. The method according to claim 20, wherein the aprotic polar solvent is dimethyl sulfoxide.

22. The method according to claim 21, wherein a weight ratio of the dimethyl sulfoxide to the ionic liquid is not more than 309%.

23. The method according to claim 13, wherein L is —(CH$_2$)$_2$—.

24. The method according to claim 13, wherein L is —(CH$_2$)$_3$—.

* * * * *